United States Patent [19]

Perkins et al.

[11] 3,958,534

[45] May 25, 1976

[54] ANIMAL CAGE

[75] Inventors: Roy Frederick Perkins, Reigate; John Richard Calvert, Epping, both of England

[73] Assignee: Genyk Products Limited, Mitcham, England

[22] Filed: Jan. 10, 1975

[21] Appl. No.: 540,295

[30] Foreign Application Priority Data
Jan. 14, 1974 United Kingdom............... 1719/74

[52] U.S. Cl. .............................................. 119/15
[51] Int. Cl.² ........................................ A01K 1/00
[58] Field of Search ............... 119/1, 15, 17, 18, 19

[56] References Cited
UNITED STATES PATENTS

| | | | |
|---|---|---|---|
| 3,367,308 | 2/1968 | Quattrone et al. | 119/18 X |
| 3,742,908 | 7/1973 | Merino | 119/15 |
| 3,774,576 | 11/1973 | Moore | 119/17 |
| 3,791,346 | 2/1974 | Willinger et al. | 119/17 |

*Primary Examiner*—Louis G. Mancene
*Assistant Examiner*—J. N. Eskovitz
*Attorney, Agent, or Firm*—Blum, Moscovitz, Friedman & Kaplan

[57] ABSTRACT

An enclosure for small domestic pet animals, such as hamsters and gerbils for example, comprising two compartments interconnected by a hollow passageway member, wherein one of the compartments and said hollow member are together adjustable in position while part of the other compartment remains stationary.

In a preferred form said stationary part carries an obturating member with which said hollow member can be brought into engagement upon rotation of said hollow member, so as to close off said other compartment from the passageway afforded by said hollow member.

The enclosure may additionally comprise a third compartment.

2 Claims, 9 Drawing Figures 3,958,534

ANIMAL CAGE

BACKGROUND OF THE INVENTION

While animal cages are known in the prior art, the cage of the present invention is compact, versatile, attractive, easily cleaned, easily expanded and is well suited for small animals such as hamsters and gerbils.

SUMMARY OF THE INVENTION

This invention relates to enclosures for animals and particularly for small domestic pet animals such as hamsters and gerbils, for example.

According to the present invention in its broadest aspect, we provide an enclosure for small domestic pet animals comprising first and second compartments interconnected by a hollow passageway member which communicates with the interior of both compartments, wherein the first compartment and the said passageway member are together adjustable in position while part of the second compartment remains stationary.

According to another aspect of the invention, we provide an enclosure for small domestic pet animals wherein first and second compartments are interconnected by a hollow passageway member of which one end projects within the second compartment and which is rotatable relative to a stationary element of the latter compartment, said stationary element carries an obturating member which projects within the second compartment and with which said one end of the hollow member can be brought into engagement or near engagement by rotation of the hollow member so as to close off the interior of the second compartment from the passageway afforded by the hollow member.

According to yet another aspect of the present invention, we provide an enclosure for small domestic pet animals wherein interconnected first and second compartments are together rotatable relative to a stationary element which serves as a floor or end wall of the second compartment, the means interconnecting said compartments comprises a hollow passageway member which communicates with the interior of both compartments and one end of which projects within the second compartment, and the aforesaid stationary element carries an obturating member which projects within the second compartment and with which the said one end of the hollow member can be brought into engagement or near engagement, upon rotation of the compartments in relation to the said element, so as to close off the interior of the second compartment from the passageway afforded by the hollow member.

The obturating member may comprise a protrusion formed integrally with the stationary element.

Preferably the enclosure additionally comprises a third compartment, and a second hollow passageway member carried by the stationary element and communicating with the interior of the second and third compartments, with one end of the second hollow member projecting within the third compartment. The other end of the second hollow member may project within the second compartment to constitute the obturating member or (when the obturating member is formed integrally with the stationary element as aforesaid) to constitute a second obturating member.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

Three inter-related embodiments of the present invention will now be described in greater detail and by way of example, with reference to the accompanying drawings in which.

DESCRIPTION OF THE PREFERRED EMBODIMENTS

Figure 1:
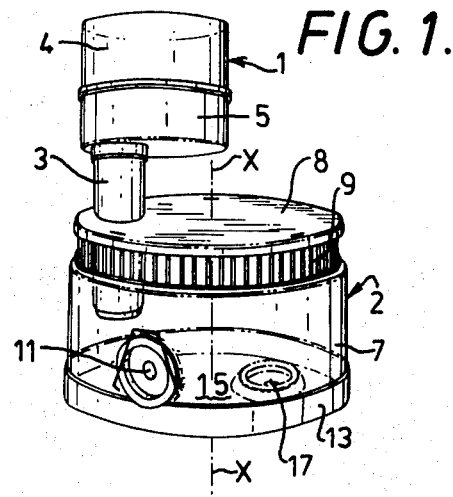
FIG. 1 is a perspective view of a first, or basic embodiment comprising first and second compartments only.
Figure 5:
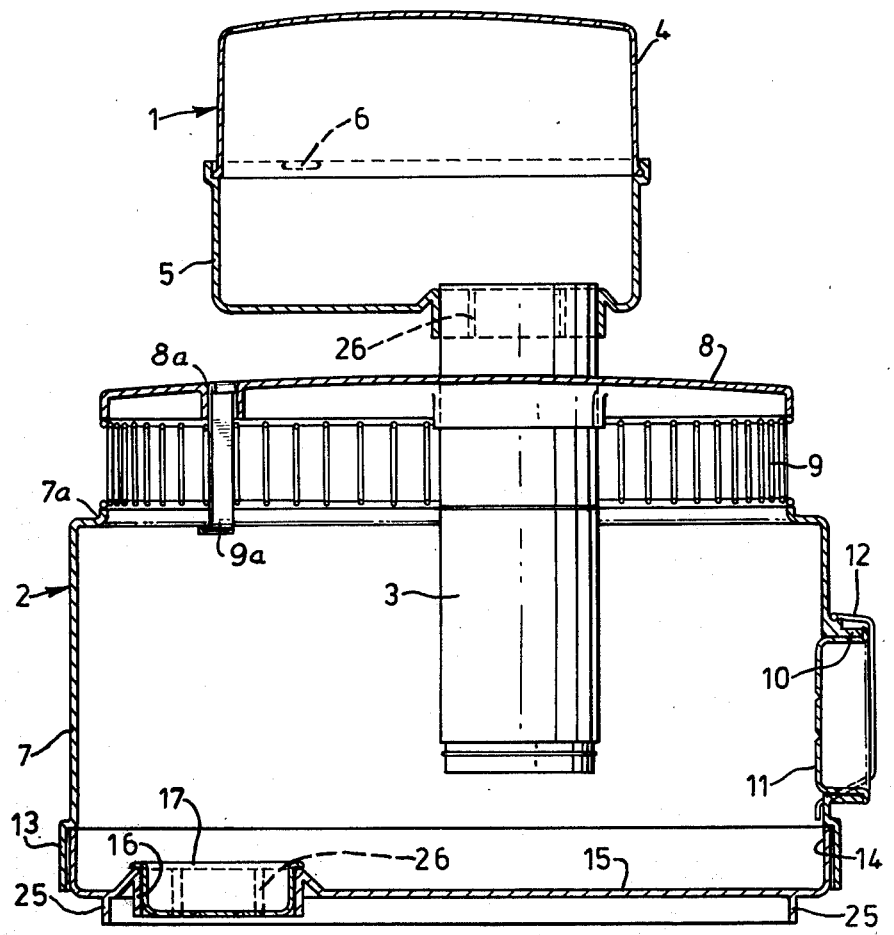
FIG. 5 is a relatively large scale sectional view of the first embodiment.

Referring first to the basic enclosure shown in FIGS. 1 and 5, this comprises first and second compartments 1 and 2 respectively which are interconnected by a tubular passage 3. This tube projects at its lower end within the second compartment, normally to the extent illustrated in the accompanying drawings although the tube is in fact axially adjustable in relation to its seating, and is throughout of an internal diameter sufficient to allow a hamster or gerbil to climb or descend from one compartment to the other through the passageway which the tube defines.

The first compartment, or loft, is composed of upper and lower parts 4 and 5 which are made of a resilient plastics material and the upper one of which is snapped into releasable engagement with the lower, the part 4 having an outwardly directed lower rim which is releasably retained in the assembled position by inwardly projecting formations such as 6 (FIG. 5) carried by the part 5.

The second compartment comprises a cylindrical side wall 7 of transparent plastic material, a removable roof 8 and an open wirework railing section 9 which interconnects these two parts and which is provided for ventilation purposes. Railing section 9 carries a plurality (three, for example) of fingers 9a for releasably joining the railing section with wall 7 and roof 8. The lower end of finger 9a fits beneath a lip 7a on wall 7 and the upper end of finger 9a projects through and cooperates with a slot 8a in roof 8. A side port 10 (FIG. 5) is provided in the wall 7 so that the compartment 2 can be connected to another such compartment if desired, for example by means of an additional tubular passage such as 3, but the port is closed by a stop member 11 when not in use. The stop member is held in position by a pivoted wire catch 12.

At its lower end the side wall 7 is belled to provide an annular shoulder formation 13 which rests as a sliding fit upon an upturned annular flange 14. This flange forms part of an element 15 which serves as a stationary end wall or floor for the compartment 2. By virtue of the sliding engagement of the shoulder formation 13 with the flange 14, the first and second compartments of the enclosure together with the tube 3 can be rotated as a single unit in relation to the stationary element 15.

As will be seen from the accompanying drawings, the tubular passage 3 is mounted eccentrically of the axis of rotation (X—X) of the compartments 1 and 2 that is to say, the longitudinal center line of the tube 3 is laterally offset from said axis of rotation. The stationary floor element 15 is itself formed with a port 16 (FIG. 5) which is identically offset from the axis X—X, but since this port has no function to perform in the embodiment illustrated in FIGS. 1 and 5 it is blanked off in that embodiment by means of a stop member 17.

The second embodiment (FIGS. 2 and 6) differs from the first in one respect only, namely the provision of an upstanding boss 18 which is formed integrally with the floor element 15 and is laterally offset from the axis X—X by exactly the same extent as the tube 3 and the port 16. The boss 18 is of substantially the same diameter as the tube 3 and is of hollow construction with a closed flat top surface.

Figure 2:
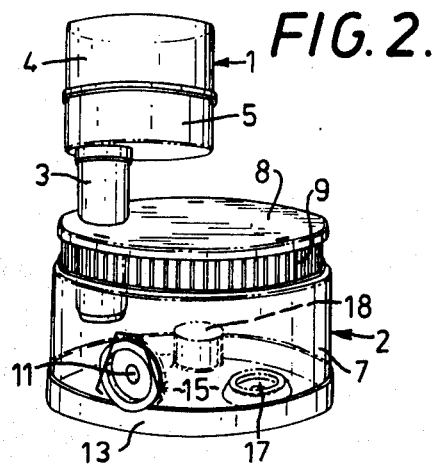
FIG. 2 is a perspective view of a second embodiment which differs from the first only insofar that it additionally comprises an obturating member.
Figure 6:
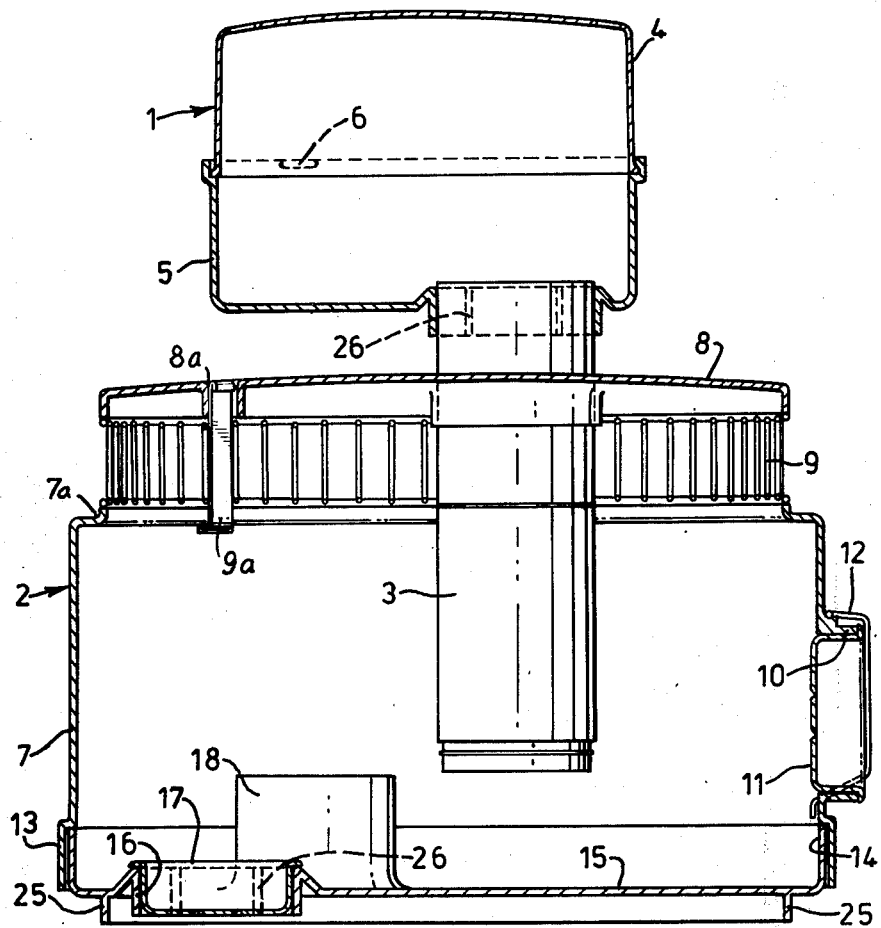
FIG. 6 is a sectional view of the second embodiment, drawn to the scale of FIG. 5.

Because the tube 3 and the boss 18 are radially displaced by exactly the same distance from the axis of rotation of the compartments 1 and 2, rotation of the tube relative to the floor element 15 about the axis X—X will bring the tube 3 into axial alignment with the boss and also into registering or near registering engagement therewith when the tube projects into the second compartment to the extent indicated in FIGS. 2 and 6. It will be appreciated that when the tube 3 and boss 18 are in registering or near registering engagement, the enclosure as a whole is effectively subdivided into two separate areas: namely the first compartment plus the interior of the tube on one hand, and the second compartment on the other. The facility to seal off one part of the enclosure from another in this simple manner is of considerable practical advantage, for example, when it is wished to clean part of the enclosure without allowing the caged pet to escape.

Referring now to the enclosure illustrated in FIGS. 3, 4, 7 and 8, this third embodiment differs from the second in one basic respect only: namely the provision of an open-topped third compartment 19 which underlies compartments 1 and 2 and is linked to the latter by a second tube 20 identical in construction and internal dimensions to the tube 3. The compartment 19 comprises a substantially cylindrical side wall 21 made of a transparent plastic material and formed integrally with a base 22. At its top, the side wall 21 carries an annular railing 23 of wirework which is provided for the same purpose as the wirework railing section 9 in compartment 2. Flat metal fingers such as 24 (FIG. 7) carried by railing 23 project into slots in wall 21 and project above the railing 23 and frictionally fit inside an annular flange 25 depending from the floor element 15, while the flange 25 itself rests upon the top of the railing.

Figure 3:
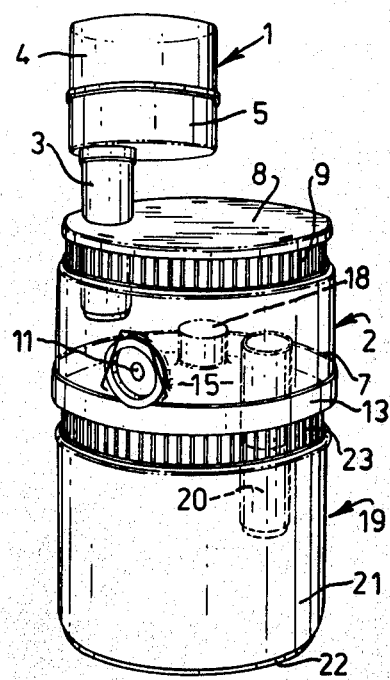
FIG. 3 is a perspective view of a third embodiment comprising a third compartment in addition to the first and second.
Figure 4:
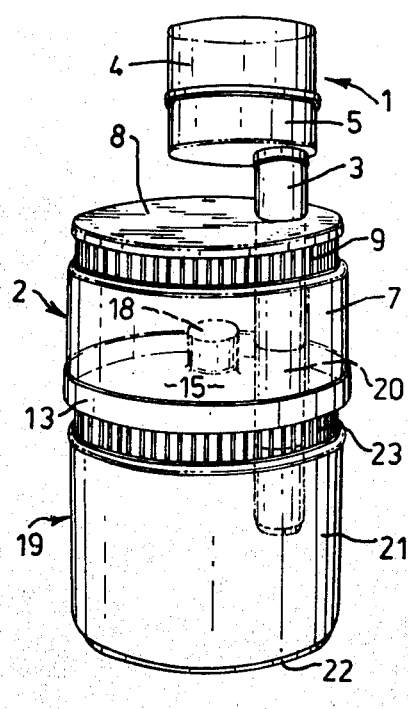
FIG. 4 is a further perspective view of the third embodiment but showing a top part thereof adjusted through rotation in relation to a lower part.
Figure 7:
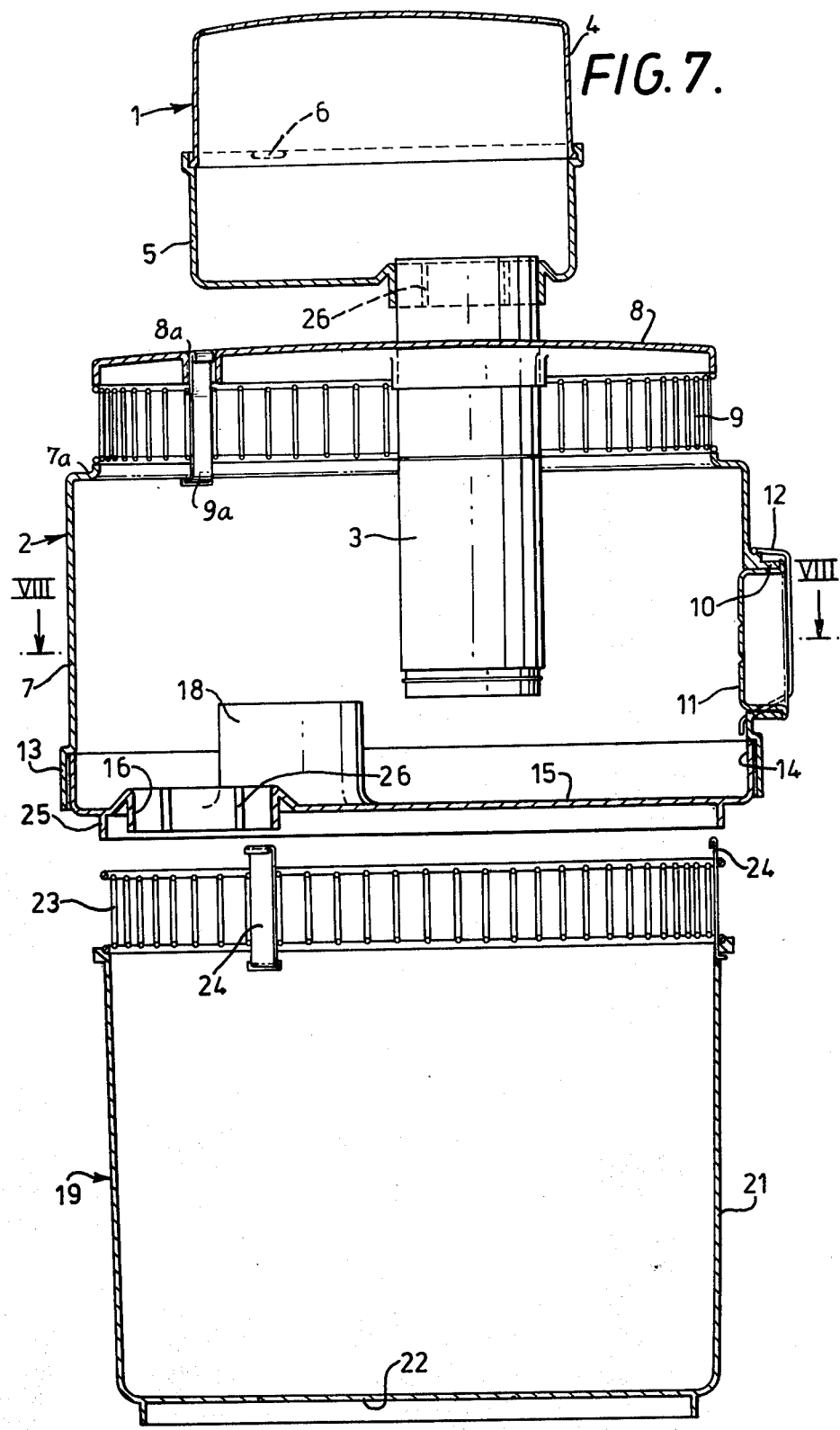
FIG. 7 is a sectional view of the third embodiment, drawn to the scale of FIGS. 5 and 6, but omitting a lower tubular passage and showing the third compartment separated from the first and second compartments for ease and clarity of illustration.
Figure 8:
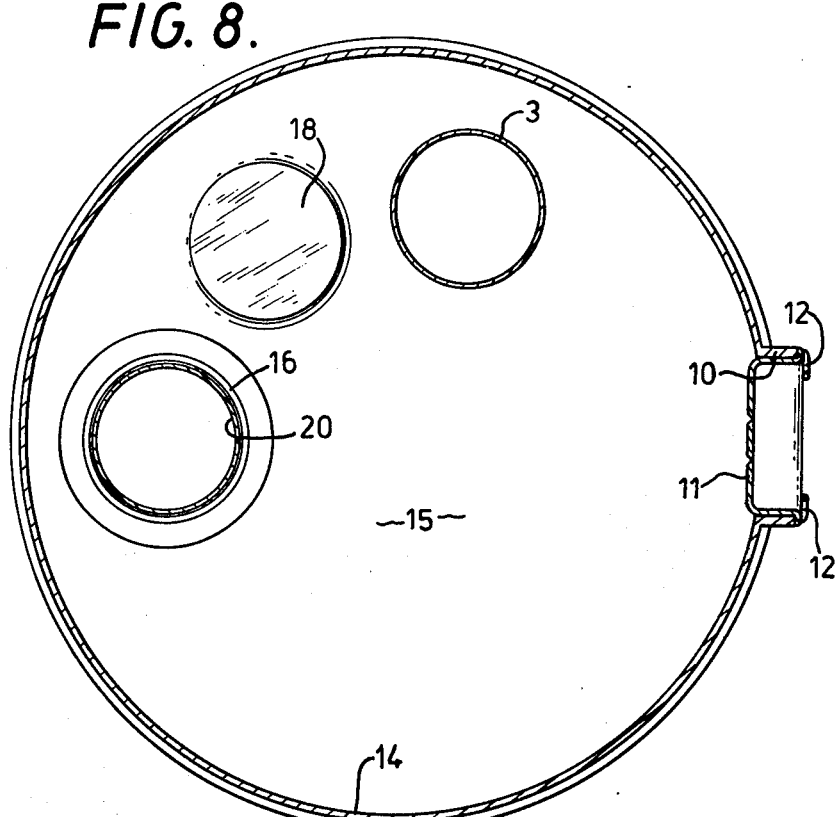
FIG. 8 is a transverse sectional view on the line VIII—VIII of FIG. 7.

The tube 20, omitted from FIG. 7 but shown in FIGS. 3 and 4, is seated in the port 16 (the stop member 17 having been removed for the purposes of this embodiment) and, being axially adjustable in relation to this seating, projects to a variable extent within the compartments 2 and 19. Normally the setting of the tube 20 is such that its upper end projects into the compartment 2 to a height equivalent to that of the boss 17; with a tube 20 of the overall length illustrated in FIGS. 3 and 4, such a setting will leave the lower end of the tube well short of the base 22 but this is done deliberately since the lower part of the container 19 will generally be used to accommodate a considerable thickness of bedding material for the hamster or gerbil.

In the third embodiment, rotation of the compartments 1 and 2 in relation to the floor element 15 is carried out as already described but this does not affect compartment 19 which remains stationary. Thus with rotation as aforesaid and with the above described normal setting for the tube 20, the interior of the enclosure as a whole can assume any one of the following conditions:

a. A first condition wherein tube 3 is out of alignment and engagement with both the tube 20 and the boss 18. In this condition, illustrated in FIG. 3, both tubes are open and the caged animals thus has access to all three compartments.

b. A second condition wherein tube 3 is in alignment and engagement or near engagement, with tube 20. In this condition, which is illustrated in FIG. 4, the middle compartment 2 is effectively sealed off from the other two. Thus an animal may be confined to the middle compartment or alternatively may be given the free run of the top and bottom compartments with the aligned tubes 3 and 20 affording access from one to the other.

c. A third condition, not illustrated, in which tube 3 engages or nearly engages with the boss 18. In this condition the tube 3 is obturated at its lower end while tube 20 remains unobstructed. Thus the enclosure is effectively divided into two areas, one consisting of compartments 2 and 19 with tube 20 affording communication between the two, and the other consisting of the top compartment 1 plus the length of tube 3.

Although described and illustrated herein, the boss 18 does not form an essential part of the present invention and it may be omitted altogether although this would also eliminate the facility of achieving the third condition described at (c) above.

Reference has been made herein to the tubes 3 and 20 being axially adjustable in relation to their respective seatings. This is effected simply by sliding the tubes relative to their seatings, the tubes being held therein purely by frictional engagement with ribs or splines 26 (FIGS. 5, 6 and 7) with which the seating bosses are formed. The frictional engagement between the tube 3 and the seating boss in the part 5 is such as to permit rotation of the compartment 1 about the tube: for example, as between the relative positions of the compartment 1 and tube 3 shown in FIGS. 3 and 4 respectively.

The tubes 3 and 20 may be provided with footholds, such as apertures formed in the tube walls for example, but since it is found in practice that hamsters are able to ascend and descend a smooth bore tube of appropriate internal diameter, the provision of positive footholds is not regarded as a necessary feature.

Figure 9:
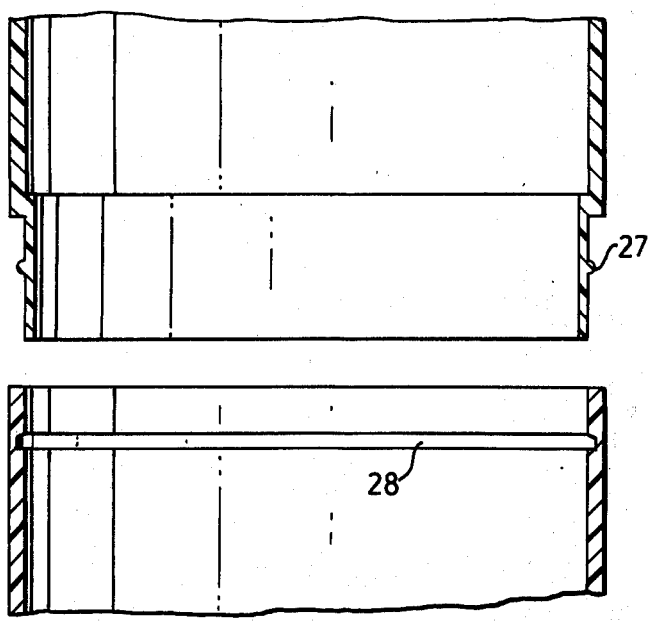
FIG. 9 is a fragmentary view of two juxtaposed tube modules such as are used to make up a tubular passage.

For the sake of flexibility in extending the enclosure system described herein, and also for ease of manufacture and cleaning, tubes such as 3 and 20 are each made up of two or more relatively short tube lengths releasably joined together in the manner illustrated in FIG. 9. Each such tube length or module is made of a resilient plastic material and is formed near one end with an annular bead 27, a complementary internal annular recess 28 being formed near the other end of the module. Thus the said one end of a first module can simply be pushed into snap engagement with the said other end of a second module, the bead 27 being held within the recess 28 until the modules are pulled apart for cleaning or alternative assembly.

If the upper tube 3 is sufficiently long or is appropriately adjusted in position axially of its length, the top compartment 1 can be closed off for cleaning or other purposes by simply sliding the compartment down the tube until the upper end of the latter comes into engagement or near engagement with the upper part 4 of compartment 1.

It will be appreciated that the enclosure described herein can be readily extended both horizontally and vertically if desired; horizontally by means of lateral ports such as 10 leading via tubes such as 3 and 20 to other identical enclosures, and vertically by the interposing of several compartments such as 2 between compartments 1 and 19.

It will thus be seen that the features set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An enclosure for small domestic pet animals comprising a first compartment having a floor, walls and a roof, and an aperture through said floor, a second compartment having a circular floor, a roof having an aperture therethrough and a continuous circular wall having a lower edge cooperating with said circular floor to permit relative rotation between said continuous circular wall and said circular floor to thereby provide means for adjusting said roof with respect to said circular floor, and a hollow passageway member joining said first and second compartments through said apertures.

2. An enclosure for small domestic pet animals as claimed in claim 1 wherein said floor of said second compartment includes an obturating member projecting within said second compartment, said obturating member being adapted for cooperation with said hollow passageway member to close off the interior of said second compartment from the passageway afforded by said hollow member.

* * * * *